(12) United States Patent
Park et al.

(10) Patent No.: US 11,381,625 B2
(45) Date of Patent: *Jul. 5, 2022

(54) APPARATUS AND METHOD FOR TRANSMITTING MULTIMEDIA DATA IN HYBRID NETWORK

(71) Applicant: Samsung Electronics Co., Ltd., Suwon-si (KR)

(72) Inventors: Kyung-Mo Park, Seoul (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,277

(22) Filed: Jul. 12, 2019

(65) Prior Publication Data

US 2019/0334971 A1 Oct. 31, 2019

Related U.S. Application Data

(63) Continuation of application No. 14/818,776, filed on Aug. 5, 2015, now Pat. No. 10,356,148, which is a
(Continued)

(30) Foreign Application Priority Data

Oct. 13, 2011 (KR) .................. 10-2011-0104879

(51) Int. Cl.
*H04L 65/60* (2022.01)
*H04N 21/438* (2011.01)
(Continued)

(52) U.S. Cl.
CPC .......... *H04L 65/607* (2013.01); *H04L 69/22* (2013.01); *H04N 21/236* (2013.01); *H04N 21/438* (2013.01); *H04N 21/64322* (2013.01)

(58) Field of Classification Search
CPC .............. H04N 21/236; H04N 21/438; H04N 21/64322; H04L 69/22; H04L 65/607
(Continued)

(56) References Cited

U.S. PATENT DOCUMENTS 5,862,136 A * 1/1999 Irwin .................... H04L 49/309
370/395.4
6,956,870 B1 * 10/2005 Charriere .............. H04L 49/108
370/470
(Continued)

FOREIGN PATENT DOCUMENTS

CN 1960270 A 5/2007
CN 101068210 A 11/2007
(Continued)

OTHER PUBLICATIONS

Indian Examination Report dated Oct. 23, 2019, issued in Indian Application No. 3346/CHENP/2014.
(Continued)

*Primary Examiner* — John W Miller
*Assistant Examiner* — Sean N. Haiem
(74) *Attorney, Agent, or Firm* — Jefferson IP Law, LLP

(57) ABSTRACT

An apparatus and a method for transmitting multimedia data in a hybrid network are provided. The apparatus includes a payload part including at least one of first data synchronized according to a time to be reproduced and second data other than the first data, a first header part including information on the payload part, a packet part for generating a packet, the packet part including a second header part including information on the packet, and a transceiver for generating and transmitting a signal including the payload part, the first header part, and the packet part to the hybrid network.

8 Claims, 2 Drawing Sheets

Related U.S. Application Data continuation of application No. 13/651,815, filed on Oct. 15, 2012, now Pat. No. 9,112,946.

(51) Int. Cl.
*H04N 21/236* (2011.01)
*H04N 21/643* (2011.01)
*H04L 69/22* (2022.01)

(58) Field of Classification Search
USPC ....... 370/474, 466, 310, 469, 315, 503, 352, 370/473; 375/240.18, 240.25, 240.26; 709/249; 725/118
See application file for complete search history.

(56) References Cited

U.S. PATENT DOCUMENTS

| | | | |
|---|---|---|---|
| 8,098,388 B2* | 1/2012 | Suzuki | H04N 7/1675 358/1.15 |
| 8,230,343 B2 | 7/2012 | Logan et al. | |
| 2001/0015985 A1* | 8/2001 | Van Grinsven | H04N 21/4381 370/471 |
| 2002/0099854 A1* | 7/2002 | Jorgensen | H04L 1/20 709/249 |
| 2003/0093790 A1* | 5/2003 | Logan | G10H 1/0033 725/38 |
| 2003/0163781 A1* | 8/2003 | Visharam | H04N 21/23439 715/201 |
| 2003/0179777 A1* | 9/2003 | Denton | H04L 43/50 370/503 |
| 2005/0141557 A1* | 6/2005 | Bradac | H04L 69/12 370/469 |
| 2005/0254798 A1* | 11/2005 | Kato | H04N 9/8042 386/334 |
| 2006/0039355 A1* | 2/2006 | Rao | H04L 1/1854 370/352 |
| 2006/0291452 A1 | 12/2006 | Velagaleti et al. | |
| 2007/0086481 A1* | 4/2007 | Klemets | H04N 21/6437 370/466 |
| 2007/0133605 A1* | 6/2007 | Herrmann | H04L 1/1812 370/473 |
| 2007/0140650 A1* | 6/2007 | Suzuki | H04N 7/173 386/291 |
| 2008/0075073 A1* | 3/2008 | Swartz | H04L 63/162 370/389 |
| 2008/0080619 A1* | 4/2008 | Heng | H04N 19/61 375/240.18 |
| 2008/0186946 A1* | 8/2008 | Marinier | H04L 49/90 370/349 |
| 2008/0275905 A1* | 11/2008 | Hannuksela | G06F 16/40 |
| 2008/0285501 A1* | 11/2008 | Zhang | H04L 45/20 370/315 |
| 2009/0079878 A1* | 3/2009 | Lee | H04N 5/455 348/724 |
| 2009/0150941 A1* | 6/2009 | Riedl | H04N 7/173 725/61 |
| 2010/0058082 A1* | 3/2010 | Locker | G06F 1/3209 713/320 |
| 2010/0293287 A1 | 11/2010 | Kobayashi | |
| 2010/0329161 A1* | 12/2010 | Ylanen | H04W 88/06 370/310 |
| 2011/0019747 A1* | 1/2011 | Hannuksela | H04N 21/44004 375/240.25 |
| 2011/0119395 A1* | 5/2011 | Ha | H04L 47/2416 709/231 |
| 2011/0134816 A1* | 6/2011 | Liu | H04L 5/0032 370/310 |
| 2011/0238991 A1* | 9/2011 | Schipper | H04N 21/4623 713/168 |
| 2011/0255558 A1* | 10/2011 | Hwang | H04L 65/60 370/474 |
| 2011/0299443 A1* | 12/2011 | Lee | H04W 28/06 370/310 |
| 2012/0233345 A1* | 9/2012 | Hannuksela | H04N 21/26258 709/231 |
| 2013/0003869 A1* | 1/2013 | Burt | H04N 21/643 375/240.26 |
| 2013/0039278 A1* | 2/2013 | Bouazizi | H04L 65/4076 370/328 |
| 2016/0044532 A1* | 2/2016 | Champel | H04N 19/40 370/329 |

FOREIGN PATENT DOCUMENTS

| | | |
|---|---|---|
| CN | 101098173 A | 1/2008 |
| CN | 101179735 A | 5/2008 |
| CN | 101222290 A | 7/2008 |
| CN | 101764825 A | 6/2010 |
| CN | 102098571 A | 6/2011 |
| EP | 2 227 052 A1 | 9/2010 |
| JP | 2010-98763 A | 4/2010 |

OTHER PUBLICATIONS

Jaeyeon Song et al., "Response to CfPs on MPEG Media Transport (MMT)", Jan. 19, 2011, XP030047833, pp. 18-23.

European Office Action dated Mar. 22, 2018, issued in European Patent Application No. 17188375.4-1208 / 3273661.

Ernesto Exposito, Mathieu Gineste, Laurent Dairaine, and Christophe Chassot, "Building self-optimized communication systems based on applicative cross-layer information", Computers Standards and Interfaces, Apr. 17, 2007, University of Toulouse, LAAS-CNRS, 7 avenue du colonel Roche, 31077 Toulouse Cedex 4, France.

Japanese Office Action dated Apr. 3, 2018, issued in Japanese Patent Application No. 2017-039906.

XP001059407, "MPEG Standards Section 3 the MPEG Systems Layer Standard" Jan. 1, 1997.

XP025658193, "Building self-optimized communication systems based on applicative cross-layer information" Feb. 1, 2009.

XP030047438, "Response to the CfP on MMT: Proposal of Advanced Transport Scheme on Broadcast and Broadband" (ISO/IEC JTC1/SC29/WG11) Jan. 19, 2011.

XP030048987, "MMT : Proposed operation in E.3, E.2 layers" 9ISO/I EC JTC1/SC29/WG11) Jul. 12, 2011.

XP055171299, "Chapter 3: MPEG-2 Systems", In: "Digital Multimedia Standards Series" Jan. 1, 2002.

XP015009755, "RTP Payload Format for H.264 Video; rfc3984.txt" Feb. 1, 2005.

XP030018447, "Technology under Considerations on MPEG Media Transport" Apr. 16, 2011.

XP030018665, "Technology under Considerations on MPEG Media Transport" (ISO/IEC JTC1/SC29/WG11) Aug. 24, 2011.

"Review of w11792", JCTVC-EJCTVC-E360-v3, ISO/IEC JTC1/SC29/WG11, Mar. 20, 2011.

"Response to Call for Proposals for MPEG Media Transport", ISO/IEC JTC1/SC29/WG11, MPEG2011/M19266, J. Song, et al. Jan. 2011.

U.S. Non-Final Office Action dated Feb. 9, 2021, issued in U.S. Appl. No. 16/510,417.

Chinese Examination report dated Aug. 2, 2021, issued in Chinese Application No. 201811147508.9.

* cited by examiner

APPARATUS AND METHOD FOR TRANSMITTING MULTIMEDIA DATA IN HYBRID NETWORK

CROSS-REFERENCE TO RELATED APPLICATION(S)

This is a continuation application of a prior application Ser. No. 14/818,776, filed on Aug. 5, 2015, which will issue as U.S. Pat. No. 10,356,148 on Jul. 16, 2019, which is a continuation of U.S. patent application assigned Ser. No. 13/651,815, filed Oct. 15, 2012, which issued as U.S. Pat. No. 9,112,946 on Aug. 18, 2015, and which claims the benefit under 35 U.S.C. § 119(a) of a Korean patent application filed on Oct. 13, 2011 in the Korean Intellectual Property Office and assigned Serial No. 10-2011-0104879, the entire disclosure of each of which is hereby incorporated by reference.

BACKGROUND OF THE INVENTION

1. Field of the Invention

The present invention relates to an apparatus and a method for transmitting multimedia data in a hybrid network. More particularly, the present invention relates to an apparatus and a method for transmitting multimedia data by applying a Motion Pictures Experts Group (MPEG) Media Transport (MMT).

2. Description of the Related Art

As multimedia services have increased, Motion Pictures Experts Group (MPEG) Media Transport (MMT) technology has been developed for providing a hybrid network that simultaneously connects a broadcasting network and a communication network and hybrid contents in which multimedia data, an application, and files are simultaneously provided. The MMT technology is a multimedia transmission technology based on MPEG technology, may be used for broadcasting data for viewing by devices including and similar to a multifunctional smart TeleVision (TV), a multiview TV and a multimedia service, and may provide an efficient MPEG transmission technology in a multimedia service environment that changes according to an Internet Protocol (IP) address. However, when multimedia data is transmitted in the current hybrid network, it is difficult to provide a service suitable for the hybrid network environment.

Therefore, a need exists for a system and method for an apparatus and a method for transmitting multimedia data by applying MMT.

SUMMARY

Aspects of the present invention are to address at least the above-mentioned problems and/or disadvantages and to provide at least the advantages described below. Accordingly, an aspect of the present invention is to provide an apparatus and a method for transmitting multimedia data in a hybrid network.

Another aspect of the present invention is to provide an apparatus and a method for generating Motion Pictures Experts Group (MPEG) Media Transport (MMT) Transport Packet (TP) data and transmitting multimedia data in a hybrid network.

Another aspect of the present invention is to provide an apparatus and a method for defining MMT TP data header information and payload data information and transmitting multimedia data.

Another aspect of the present invention is to provide an apparatus and a method for defining information required for transmitting an MMT TP and transmitting multimedia data.

Another aspect of the present invention is to provide an apparatus and a method for guaranteeing Quality of Experience (QoE) for an MMT TP and transmitting multimedia data.

In accordance with an aspect of the present invention, an apparatus for transmitting data in a hybrid network that simultaneously provides broadcasting and Internet communication is provided. The apparatus includes a payload part including at least one of first data synchronized according to a time to be reproduced and second data other than the first data, a first header part including information on the payload part, a packet part for generating a packet, the packet part including a second header part including information on the packet, and a transceiver for generating and transmitting a signal including the payload part, the first header part, and the packet part to the hybrid network.

In accordance with another aspect of the present invention, a method of transmitting data in a hybrid network that simultaneously provides broadcasting and Internet communication is provided. The method includes generating a payload part including at least one of first data synchronized according to a time to be reproduced and second data other than the first data, generating a first header part including information on the payload part, generating a packet, the packet including a second header part including information on the packet, and transmitting the packet to the hybrid network.

Exemplary embodiments of the present invention may provide header information of an MMT transport packet and payload information for transmitting hybrid multimedia data in a hybrid network, and thus provide a service suitable for a hybrid network environment through application of an MMT technology.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, a hybrid network environment may be an environment having a network connection between a server and a client where a dedicated network for broadcasting, hereinafter, referred to as a "broadcast" network, and a network for Internet communication, hereinafter, referred to as a "broadband" network. The hybrid network environment may be simultaneously provided to the same client and the client may receive a service through a plurality of networks. Further, a plurality of network environments may include a plurality of connection environments including a broadcast network, a broadcast environment, a broadband network, and a broadband environment. The plurality of network environments may be configured by hybridly connecting two environments, and may include a wired network and/or wireless network.

Furthermore, hybrid multimedia contents, according to the present exemplary embodiments, may refer to contents which may be hybridly used because the hybrid multimedia contents contain both multimedia contents reproduced with temporal, i.e., real-time, characteristics, such as an audio signal, a video, a synchronized caption, and an image and data with non-real time characteristics such as an audio book, a multimedia widget, a file and/or other similar contents and data.

Figure 1:
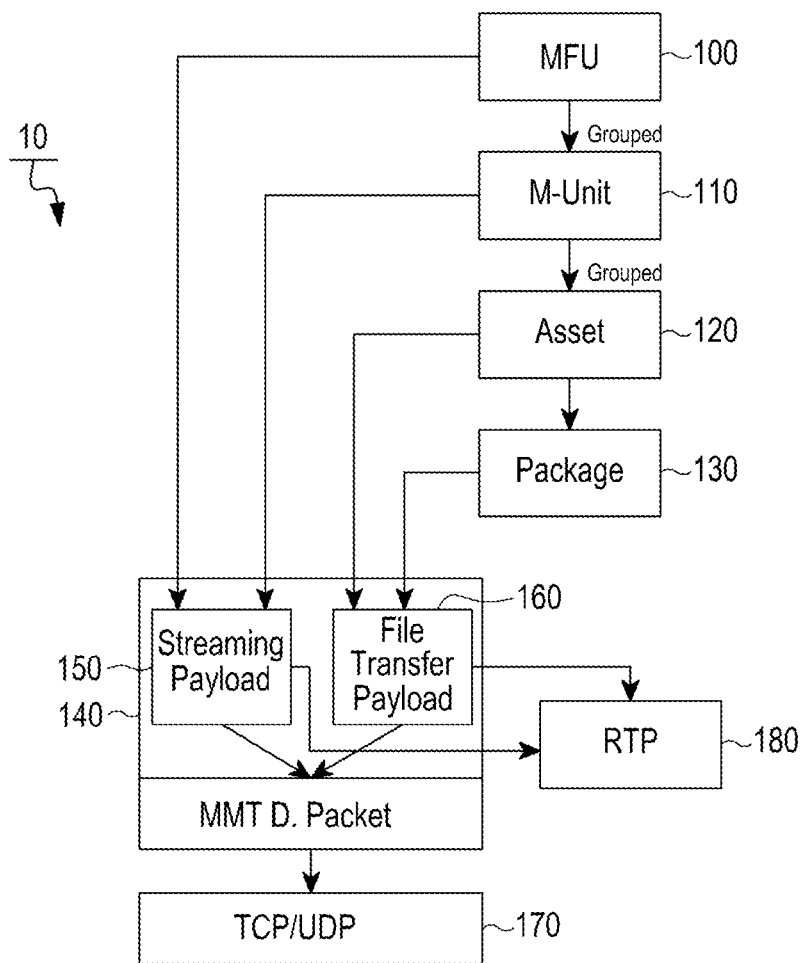
FIG. 1 illustrates an apparatus for transmitting hybrid multimedia contents according to an exemplary embodiment of the present invention.

FIG. 1 illustrates an apparatus for transmitting hybrid multimedia contents according to an exemplary embodiment of the present invention.

An apparatus 10 for transmitting the hybrid multimedia contents according to an exemplary embodiment of the present invention may transmit the hybrid multimedia contents by using an Motion Pictures Experts Group (MPEG) Media Transport (MMT) technology. A transport layer of the MMT may configure a transport structure according to data contained in the hybrid multimedia contents and may serve a function for efficiently transmitting the data. To this end, the MMT transport layer may include a structure where common transport information and distinguishing transport information are discriminated.

Referring to FIG. 1, an MMT payload of the transmission apparatus 10 for transmitting multimedia contents may include a streaming payload 150 for transmitting real time data, for example, real time broadcasting, and a file transfer payload 160 for transmitting non-real time data. The streaming payload 150 may be configured using at least one of an MMT Media-unit 110, hereinafter, referred to as an "M-unit" 110, and an MMT Media Fragment Unit 100, hereinafter, referred to as an "MFU" 100, of the hybrid multimedia contents as a basic unit transmitted for real time data transmission. In a video which may be independently decoded, the MFU 100 may refer to a frame of an encoding or one slice when the frame includes a plurality of slices. Further, in a video which may be independently decoded, the M-unit 110 refers to a frame of an encoding or a Group of Picture (GOP) unit corresponding to an encoding handling unit which may be independently decoded. The MFU 100 or the M-unit 110 may determine its structure by considering an attribute and a service of the hybrid media. The file transfer payload 160 may be used for non-real time data transmission, and all of, or a particular part unit of, an MMT asset 120, hereinafter, referred to as an "asset" 120, or an MMT package 130, hereinafter, referred to as a "package" 130, of the hybrid multimedia contents may be configured as a basic unit for transmission.

The asset 120 is consecutive streams of the M-units 110, all of which may be configured in the same media type. Here, the M-units 110 configured in the same media type may include an audio M-unit, a video M-unit, an audio/video M-unit, and any other similar media type M-units. Furthermore, the package 130 may include additional information for a service in a single asset 120 or a plurality of assets 120. At this time, the additional information may include transmission environment information considering a hybrid network environment related to screen configuration information of the hybrid multimedia, for example, temporal and spatial arrangement orders, a transmission requirement bandwidth, information on whether loss is possible, information on whether a delay time is accepted and any other similar and/or suitable information.

The transmission apparatus 10 may configure the payload in units of MFUs 100 or M-units 110 and may transmit multimedia contents in a service using real time transmission, for example, real time broadcasting, and may configure the payload in units of assets 120 or packages 130. The transmission apparatus 10 may also transmit multimedia contents in a service using non-real time transmission, for example, a Video on Demand (VoD) service using a broadcasting network. The streaming payload 150 for real time data transmission and the file transfer payload 160 for non-real time data transmission may be included in an MMT transport packet 140 operating in a Transmission Control Protocol (TCP)/User Datagram Protocol (UDP) 170 environment corresponding to an Internet Protocol (IP) based address or a payload of an Real-time Transport Protocol (RTP) packet 180 corresponding to an IP address, and then transmit such to a terminal.

Meanwhile, the MMT payload, e.g., the streaming payload 150, and the file transfer payload 160 may be configured by a header region including configuration information used according to a transmission environment and a data region that includes transmission data. The transmission data may be transmitted by a single payload or may be multiplexed and then transmitted by a plurality of payloads. The payload for multiplexing may be divided into two or more slices by a predetermined unit.

Furthermore, the payload may provide an interleaving function by a predetermined unit in consideration of a particular transmission function, and may be considerably efficiently and simply defined by a general available unit structure of the transport layer. A header region of the universal MMT payload for hybrid multimedia contents transmission in the hybrid network environment may be configured as indicated in Table 1.

TABLE 1

| | |
|---|---|
| Payload Type | Fragmentation Indicator |
| Sequence Number | Length |
| Timestamp | Timestamp |
| Sequence Number | |
| Length | Timestamp |
| Timestamp | Multiplex Info. |
| Aggregation Info. | Payload Configuration | i) Payload Type

A payload type may be a data configuration type of the corresponding payload, and more specifically, may be a type of transmitted data and configuration information. At this time, the type of data and the configuration information according to the type of data may indicate a type of payload data, that is, information on whether the payload data is a complete M-unit 110, a simple fragment of the M-unit 110, a complete MFU 100, or an aggregation of a plurality of MFUs 100. Furthermore, the type of data and the configuration information may include a factor identifying whether the type of data transmitted by the corresponding payload is transmission data or control data, and may also include information on a discriminator for discriminating types of transmission data.

For example, the type of data and the configuration information may include information on a media type of transmitted data, for example, a video type, an audio type, an image type, a text type, or any other similar type, and an associated codec type. Furthermore, an additional data type may include information on whether data transmitted in the payload is a data type of single time stamp or a data type of multiple time stamp, and may include information on an identifier indicating a non-time stamp.

ii) Fragmentation Indicator

A fragment indicator may be information indicating at least one of a start, a center, and an end of the M-unit 110 when a transmitted M-unit 110 is divided into fragments. For example, when data of a corresponding payload is the MTU 100 of the media, the client may handle the data in the bundle unit of processing the data by using the information and then transmit the data. Furthermore, when receiving a last fragment of the M-unit 110, the terminal configures the complete M-unit 110 and performs a decoding processing.

In a case of transmitting a live stream or a VoD, a payload for a transmission may have a size of the single MFU 100 or the M-unit 110, and during transmission of a file, the payload may have a total size of the file. In addition, chained payloads may be indicated through such information, and a multiplexing function in units of a plurality of MFUs 100 or M-units 110 may be provided through a corresponding information configuration. A plurality of M-units 110 or MFUs 100 may be transmitted in one payload.

iii) Sequence Number

A sequence number may be increased, e.g., iterated, and transmitted by one unit with respect to each M-unit 110, and may be used by a receiver in order to detect a payload loss. The MMT performs no action for MMT packet loss, and operations concerning MMT packet loss remains for an application to perform. The MMT transmission may not guarantee transmission, but existence of the sequence number makes it possible to detect a lost M-unit 110.

iv) Length

A length field indicates a length of the payload, including a header and data.

v) Time Stamp

A time stamp filed may be used for identifying a reproduction time of the payload, and may be shown in the payload for real time transmission.

vi) Multiplexing Information

Multiplexing information may indicate that a transmission unit included in the corresponding payload is hybridly multiplexed. For example, the multiplexing information may indicate a case where a plurality of M-units 110 may be included in the payload. Furthermore, corresponding information may include a number of multiplexed configuration units, a size of each configuration unit, an offset of the configuration unit, and any other similar and/or suitable information.

vii) Aggregation

An aggregation field may indicate setting information on the M-unit 110, and information regarding this field may be dependent on a payload type. In further detail, the aggregation field may indicate a number of remaining fragments after fragments included in the corresponding payload when the M-unit 110 is in a fragmented state, and may indicate a number of M-units 110 or MFUs 100 included in the corresponding payload when the M-unit 110 is in an aggregated state.

viii) Payload Configuration

The payload may be configured according to various transmission environments and services, and may be configured in parts with respect to information applicable to all payloads and information applicable to only a particular payload. Furthermore, a very small configuration may be generally required for a particular payload, but the present exemplary embodiment may use particular configuration modes for particular purposes in order to allow a simple payload configuration except for a dedicated receiver.

For example, an MMT streams mode, a file delivery mode, and a generic mode may be used for transmitting MMT contents. Furthermore, an auxiliary field may be configured to transmit any data in order to predict requirements for transmission of information related to an additional system in the future. Specifically, the auxiliary field may include a function providing identifier which may provide a function for a loss control, loss reconstruction encoding information, information for requesting an automatic error loss reconstruction, a minimum memory buffer size provided by a terminal, a temporary memory buffer size used in transmission data, critical transmission data, a maximum loss acceptance rate, a maximum acceptance packet delay time, an average packet delay time, synchronization code information for a network synchronization, and any other similar and/or suitable information.

Next, a case where data is transmitted using the MMT payload configured as described above will be described. First, in hybrid contents data transmission for real time broadcasting, the terminal may be connected with at least one server in a broadcast network and broadband network environments, and the terminal may be used to provide a real time soccer game broadcasting service and a user additional service related to the soccer game, for example, a caption of another language and user audio explanation information to a client having a wide screen display device, in real time. In this case, the M-unit 110 or the MFU 100, which may be handled as a basic transmission unit among data units configuring real time broadcasting contents, may be contained in a single payload or a plurality of payloads and then transmitted. When the M-unit 110 is the basic transmission unit, one Group of Picture (GOP) is handled as the M-unit 110 and is transmitted using the single payload in video data.

When data of the one GOP is a maximum video unit which may be independently decoded and is encoded into an H.264 video, the maximum video unit which may be independently decoded includes a slice, and the slice may be used as a minimum unit of the MFU 100.

When the one GOP that is encoded into the H.264 video is configured by the payload for transmission by using the M-unit 110, the configuration may be made according to Table 2, and the one GOP may be configured by several payloads since a size of the one GOP is larger than a size of the payload. Furthermore, the payload, as shown in Table 2, may have the same structure when unit data of the payload is the MFU 100 as well as when the unit data of the payload is the M-unit 110.

TABLE 2 payload type: H.264 Video GOP
fragmentation indicator: on
sequence number: increase from 0
length: 1024 (byte) indicate a length of the payload
timestamp: a representative value of a reproduction time of a corresponding GOP is expressed as an NTP timestamp.
multiplexing information: off
aggregation: 5 end payload of the corresponding GOP is completed after 5 payload configuration: ALFEC indicator, DRM indicator payload Next, a case where progressive download contents are transmitted by non-real time broadcasting through a service transmitted from a plurality of servers will be described. A transmission data basic unit structure of the MMT payload for non-real time data transmission may be divided into two cases, that being a case having the asset 120 and a case having the package 130, and a payload type may be determined according to a type of each transmission data.

Furthermore, since transmission characteristics of corresponding data are according to a non-real time case, attribute information related to a time may be excluded from corresponding payload data, which may provide an efficiency in high-capacity data transmission. In addition, according to characteristics of transmission data sensitive to loss, additional information used for a loss reconstruction may be described through the auxiliary field, and information on the auxiliary field may provide data structure information related to the loss reconstruction rather than real time transmission.

In hybrid multimedia contents transmission for real time broadcasting and non-real time hybrid multimedia contents transmission, the terminal may be connected with at least one server in the broadcast network and the broadband network environments, and the terminal may be used to provide a real time soccer game broadcasting service and a user additional service related to the soccer game, for example, a caption of another language and user audio explanation information to a client having a wide screen display device in real time.

It may be considered that basic unit data of the transmission structure hybridly transmits the MFU 100 and the M-unit 110 corresponding to real time transmission data and the asset 120 and the package 130 corresponding to non-loss transmission data, and transmits additional information for describing the corresponding transmission structure through multiplexing information. The additional information may provide identification and discrimination unit information of corresponding data information through a multiplex type corresponding to multiplex structure information, an offset of each transmission data unit, a length, and an IDentification (ID) of the transmission data unit.

Meanwhile, the MMT payload, according to an exemplary embodiment of the present invention, may be transmitted by the MMT transport packet 140 or the RTP packet 180 corresponding to an IP address. The MMT transport packet 140 may have a data packet structure for MMT payload transmission and may perform a function of packetizing data by the unit of payloads and may transmit the data to the network. Furthermore, the MMT transport packet 140 includes additional information related to transmission in the header region, and the additional information may include a packet ID, a packet number, a flow ID for providing Quality of Service (QoS), a timestamp applicable as a transmission time and control information, and any other similar and/or suitable information. The above described additional information will be described below in detail.

i) Packet ID

A packet ID may be an identifier of the MMT transport packet 140, and may be an identification value allocated by a transmission side when fragments of a datagram of a lower protocol are assembled. Furthermore, the packet ID may be used as information indicating a media type of data included in the MMT payload, and may include information capable of distinguishing respective media types when data corresponding to a plurality of same media types is included in the MMT payload.

ii) Sequence Number

A sequence number may be an identification number of the transmitted packet. A reception side may determine whether a packet corresponding to a sequence number is lost through the sequence number and may perform a packet arrangement function according to the sequence number. Furthermore, sequence number information may sequentially increase, and may be set for each M-unit 110 or each asset 120.

iii) Flow Label

A flow label may identify a particular QoS used for each flow in each data transmission. For example, the flow label may include a type of packet, a delay, a throughput, a synchronization parameter and any other similar and/or suitable information, and may be fragmented and indicated according to a data transmission type as shown in Table 3 to Table 6.

Type of Packet

A Type of Packet field may indicate type information of the packet for the MMT transport packet 140, and may be a 3 bit value.

TABLE 3

| Bits 0-2 | Bit rate |
| --- | --- |
| 111 | Constant Bit Rate(CBR) |
| 110 | Real-Time Variable Bit Rate(rt-VBR) |
| 101 | Non-Real-Time Variable Bit Rate(nrt-VBR) |
| 100 | Available Bit Rate(ABR) |
| 011 | Unspecified Bit Rate(UBR) |
| 010 | Reserved |
| 001 | Reserved |
| 000 | Reserved |

Delay

A delay field may indicate a delay degree, and may be a 1 bit value, as shown in Table 4.

TABLE 4

| Bit 3 | Delay |
|---|---|
| 0 | Normal delay |
| 1 | Low delay |

Throughput

A throughput field may indicate a throughput degree, and may be a 1 bit value, as shown in Table 5.

TABLE 5

| Bit 4 | Throughput |
|---|---|
| 0 | Normal throughput |
| 1 | High throughput |

A synchronization field may indicate synchronization information, and may be a 3 bit value, as shown in Table 6.

TABLE 6

| Bit 5 | Synchronization |
|---|---|
| 0 | no relationship |
| 1 | relationship with another packet |
| Bits 6-7 | Reserved for future use | iv) Packet Configuration Information

Packet configuration information may provide configuration information, i.e., parameters, for approaching a flexible and efficient mechanism of a corresponding service class in transmission of packetized data. Such parameters are used for measuring a QoS of a connection in a network layer and an end-to-end network capability. The network may guarantee a negotiated QoS by satisfying particular values of the parameters, and corresponding parameter information may be used as a reference of the parameter of an IP version 4 (IPv4) type of service (tos) field and an IP version 6 (IPv6) QoS field. Table 7 and Table 8 show detailed parameter structures.

Delay (Range)

A delay field, which may be referred to as a range field, may indicate a maximum end-to-end acceptance delay time related to transmission. The reception side may easily determine whether a delay time is exceeded based on corresponding delay information and may reduce a corresponding time for efforts on a delay time reduction.

TABLE 7

| Bit 0-2 | Delay |
|---|---|
| 111 | 500 ms |
| 110 | 1 sec |
| 101 | 5 sec |
| 100 | 10 sec |
| 011 | unlimited |
| 010 | |
| 001 | |
| 000 | |

AU Loss Rate (%)

An Access Unit (AU) loss rate may indicate an acceptable loss ratio of the transmitted packet. A percentage of the AU loss rate may indicate a loss allowance of the packet per second. The reception side may more easily determine a method of handling a reconstruction function for the packet loss and whether the packet loss is reconstructed according to corresponding information.

TABLE 8

| Bit 3-4 | AULR |
|---|---|
| 111 | 0% |
| 110 | 10% |
| 101 | 20% |
| 100 | 30% |
| 011 | 50% |
| 010 | not specified |
| 001 | |
| 000 | |

Figure 2:
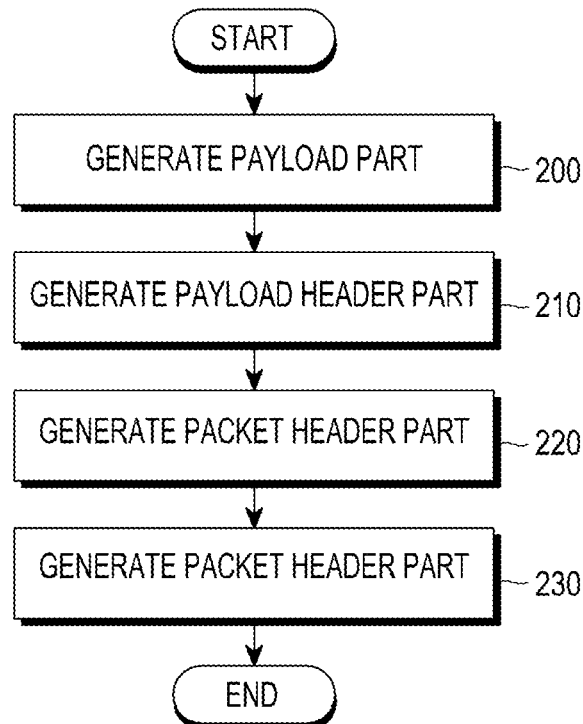
FIG. 2 illustrates a method of transmitting hybrid multimedia contents according to an exemplary embodiment of the present invention Throughout the drawings, like reference numerals will be understood to refer to like parts, components, and structures.

FIG. 2 illustrates a method of transmitting hybrid multimedia contents according to an exemplary embodiment of the present invention.

Referring to FIG. 2, the hybrid multimedia contents may be transmitted by the MMT transport packet 140, and the MMT transport packet 140 includes at least one of data synchronized and reproduced according to a time, for example, real time broadcasting, and non-real time data in order to generate a payload part in step 200. Next, in step 210, a payload header part, including information on the payload part, is generated. The packet header part, including information on the MMT transport packet 140, is then generated in step 220, the MMT transport packet 140, including the payload part, the payload header part, and then a packet header part, is generated in step 230, and the hybrid multimedia contents are transmitted using at least one of a transmitter, a transceiver, or any other similar and/or suitable transmission device. The transmitter may include at least one of an antenna and a wire line for transmitting a signal including the hybrid multimedia contents to the hybrid network.

While the invention has been shown and described with reference to certain exemplary embodiments thereof, it will be understood by those skilled in the art that various changes in form and details may be made therein without departing from the spirit and scope of the invention as defined by appended claims as their equivalents.

What is claimed is:

1. An apparatus for receiving a packet in a multimedia system, the apparatus comprising:
   a transceiver configured to receive, from a transmitting entity, a moving picture experts group media transport (MMT) packet including a header region and a payload, wherein the MMT packet is different from a real-time transport protocol (RTP) packet; and
   a controller configured to process data in the payload based on information in the header region,
   wherein the information in the header region of the MMT packet comprises:
      data unit type information including a value indicating whether the payload includes a data unit of a complete type,
      an indicator used to distinguish media data to which the MMT packet belongs from another media data,
      a one-bit flag, wherein if the one-bit flag has a first value; the one-bit flag indicates that the payload includes only one data unit, and if the one-bit flag has a second value the one-bit flag indicates that the payload includes more than one data unit, and
      payload type information indicating whether the payload includes one or more control messages.

2. The apparatus of claim 1, wherein if the value indicates that the payload does not include the data unit of the complete type, the value further identifies a position for an incomplete portion of the data unit.

3. The apparatus of claim 2, wherein the position indicates one of that the incomplete portion is a first fragment of the data unit, the incomplete portion is a last fragment of the data unit, and the incomplete portion is a fragment except for the first fragment and the last fragment among fragments of the data unit.

4. The apparatus of claim 1, wherein a packet header included in the header region comprises bitrate type information indicating whether a bit rate of the MMT packet is a constant bit rate (CBR), identification information related to a quality of service (QoS) of the MMT packet, and information related to a transmission delay of the MMT packet.

5. An apparatus for transmitting a packet in a multimedia system, the apparatus comprising:
- a controller configured to generate a moving picture experts group media transport (MMT) packet including a header region and a payload, wherein the MMT packet is different from a real-time transport protocol (RTP) packet; and
- a transceiver configured to transmit, to a receiving entity, the generated MMT packet,
- wherein the information in the header region of the MMT packet comprises:
  - data unit type information including a value indicating whether the payload includes a data unit of a complete type,
  - an indicator used to distinguish media data to which the MMT packet belongs from another media data,
  - a one-bit flag, wherein if the one-bit flag has a first value; the one-bit flag indicates that the payload includes only one data unit, and if the one-bit flag has a second value the one-bit flag indicates that the payload includes more than one data unit, and
  - payload type information indicating whether the payload includes one or more control messages.

6. The apparatus of claim 5, wherein if the value indicates that the payload does not include the data unit of the complete type, the value further identifies a position for an incomplete portion of the data unit.

7. The apparatus of claim 6, wherein the position indicates one of that the incomplete portion is a first fragment of the data unit, the incomplete portion is a last fragment of the data unit, and the incomplete portion is a fragment except for the first fragment and the last fragment among fragments of the data unit.

8. The apparatus of claim 5, wherein a packet header included in the header region comprises bitrate type information indicating whether a bit rate of the MMT packet is a constant bit rate (CBR), identification information related to a quality of service (QoS) of the MMT packet, and information related to a transmission delay of the MMT packet.

* * * * *